US009681257B2

(12) United States Patent
Zhang et al.

(10) Patent No.: US 9,681,257 B2
(45) Date of Patent: Jun. 13, 2017

(54) DATA DOWNLINK TRANSMISSION METHOD AND DEVICE

(71) Applicant: HUAWEI DEVICE CO., LTD., Shenzhen (CN)

(72) Inventors: Jun Zhang, Beijing (CN); Hui Jin, Beijing (CN); Guodong Xue, Shenzhen (CN); Qiang Yi, Beijing (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 149 days.

(21) Appl. No.: 14/586,095

(22) Filed: Dec. 30, 2014

(65) Prior Publication Data

US 2015/0110000 A1 Apr. 23, 2015

Related U.S. Application Data

(63) Continuation of application No. PCT/CN2013/086261, filed on Oct. 30, 2013.

(30) Foreign Application Priority Data

Nov. 2, 2012 (CN) .......................... 2012 1 0433549

(51) Int. Cl.
*H04W 4/00* (2009.01)
*H04W 8/04* (2009.01)
*H04W 8/12* (2009.01)

(52) U.S. Cl.
CPC ............. *H04W 4/005* (2013.01); *H04W 8/04* (2013.01); *H04W 8/12* (2013.01)

(58) Field of Classification Search
CPC .......... H04W 4/005; H04W 8/12; H04W 8/04
See application file for complete search history.

(56) References Cited

U.S. PATENT DOCUMENTS

2012/0155404 A1 6/2012 Shin et al.
2013/0035127 A1 2/2013 Wang

FOREIGN PATENT DOCUMENTS

| CN | 102238571 | 11/2011 |
|---|---|---|
| CN | 102333293 | 1/2012 |
| CN | 102340826 A | 2/2012 |
| CN | 102404710 | 4/2012 |
| CN | 102413453 | 4/2012 |

(Continued)

OTHER PUBLICATIONS

*Direct Delivery using T4 without use of T5*, SA WG2 Meeting #8, S2-115311, Nov. 14-18, 2011, San Francisco, CA (4 pp.).

(Continued)

*Primary Examiner* — Afshawn Towfighi
(74) *Attorney, Agent, or Firm* — Staas & Halsey LLP

(57) ABSTRACT

The present invention discloses a data downlink transmission method and a device, and belongs to the field of communications technologies. The method includes: receiving, by an MTC-IWF device, a first message sent by a server, where the first message includes downlink data that needs to be sent to a user equipment; and acquiring, by the MTC-IWF device, locally stored serving node information of the user equipment, and sending a second message to a serving node of the UE according to the serving node information of the UE, where the second message includes the downlink data that needs to be sent to the user equipment, so that the serving node sends the downlink data to the user equipment.

20 Claims, 10 Drawing Sheets

(56) References Cited

FOREIGN PATENT DOCUMENTS

| | | |
|---|---|---|
| CN | 102547658 A | 7/2012 |
| EP | 2 509 345 A1 | 10/2012 |

OTHER PUBLICATIONS

PCT International Search Report dated Feb. 6, 2014 in corresponding International Patent Application No. PCT/CN2013/086261.
"$3^{rd}$ Generation Partnership Project; Technical Specification Group Services and System Aspects; Machine-Type and other Mobile Data Applications Communications Enhancements (Release 12)", 3GPP TR 23.887, V0.3.0, Oct. 2012, pp. 1-52.
International Search Report mailed Feb. 6, 2014 in corresponding International Application No. PCT/CN2013/086261.
Chinese Office Action dated Jul. 5, 2016 in corresponding Chinese Patent Application No. 201210433549.0.
Extended European Search Report, dated Sep. 4, 2015, in corresponding European Application No. 13852149.7 (12 pp.).
*Direct Delivery using T4 without use of T5*, SA WG2 Meeting #88, S2-115311, Nov. 14-18, 2011, San Francisco, CA (4 pp.).
*$3^{rd}$ Generation Partnership Project; Technical Specification Group Services and System Aspects; Architecture enhancements to facilitate communications with packet data networks and applications (Release 11)*, 3GPP Ts 23.682 V11.2.0, Sep. 2012, pp. 1-29.
*Update Generic NAS Transport Solution*, SA WG2 Meeting #94, S2-124402, New Orleans, LA, Nov. 12-16, 2012 (5 pp.).

DATA DOWNLINK TRANSMISSION METHOD AND DEVICE

CROSS-REFERENCE TO RELATED APPLICATION

This application is a continuation of International Application No. PCT/CN2013/086261, filed on Oct. 30, 2013, which claims priority to Chinese Patent Application No. 201210433549.0, filed on Nov. 2, 2012, both of which are incorporated herein by reference in their entireties.

TECHNICAL FIELD

The present invention relates to the field of communications technologies, and in particular, to a data downlink transmission method and a device.

BACKGROUND

M2M (Machine-to-Machine, machine-to-machine) communication refers to a generic term for a series of technologies and technology combinations that apply various communications network and information sensing and processing to implement data communication and interaction between a machine and a machine, and between a machine and a human. A communication scenario of an M2M device is small data transmission defined by 3GPP. Small data indicates that a terminal UE (User Equipment, user equipment) only sends/receives a small amount of data.

In the prior art, a small data transmission method is defined. Specifically, small data in an uplink direction or a downlink direction is transported by using a generic NAS transport message between a UE and a serving node, a T5 interface between the serving node and an MTC gateway MTC-IWF (machine type communication interworking function) device, and a Tsp interface between the MTC-IWF device and a server. In the solution, specific steps for transmitting downlink small data are as follows:

1: The server sends, to the MTC-IWF device through the Tsp interface, a message carrying the small data in the downlink direction.

2: After receiving the message sent by the server, the MTC-IWF device queries an HLR (Home Location Register, home location register)/HSS (Home Subscriber Server, home subscriber server) storing UE subscription data and acquires information of the serving node serving the UE.

3: The MTC-IWF device sends, to the serving node through the T5 interface between the MTC-IWF device and the serving node, the message carrying the small data.

4: The serving node sends a DOWNLINK_GENERIC_NAS_TRANSPORT message to the UE, where the message carries small data that needs to be sent to the UE.

It can be known from the foregoing method for transmitting small data that, in the prior art, each time an MTC-IWF device sends small data to a UE, the MTC-IWF device needs to query an HLR/HSS to obtain routing information of the UE. This brings, if frequency of sending the small data is relatively high, great signaling load to the HLR/HSS in a scenario in which downlink data is sent frequently. In addition, if multiple such applications run on the UE simultaneously, multiple servers send small data to the UE continuously and frequently. If a lot of UEs are installed with and use such applications, in the process of sending the small data in the foregoing solution, signaling load caused by querying the HLR/HSS further increases, and therefore network congestion may be caused.

SUMMARY

To solve the problem of frequently querying an HLR/HSS during downlink data transmission, embodiments of the present invention provide a downlink data transmission method and a device. The technical solutions are as follows:

According to a first aspect, a data downlink transmission method is provided, where the method includes: receiving, by a machine type communication interworking function MTC-IWF device, a first message sent by a server, where the first message includes downlink data that needs to be sent to a user equipment; and acquiring, by the MTC-IWF device, locally stored serving node information of the user equipment, and sending a second message to a serving node of the user equipment according to the serving node information of the user equipment, where the second message includes the downlink data that needs to be sent to the user equipment, so that the serving node sends the downlink data to the user equipment.

In a first possible implementation manner of the first aspect, before the acquiring, by the MTC-IWF device, locally stored serving node information of the user equipment, the method further includes: sending, by the MTC-IWF device, to an HLR/HSS, a request for acquiring the serving node information or subscription information of the user equipment; and receiving and saving, by the MTC-IWF device, the serving node information, returned by the HLR/HSS, of the user equipment; or receiving, by the MTC-IWF device, a subscription information response message returned by the HLR/HSS, and saving the serving node information, carried in the subscription information response message, of the user equipment.

In a first possible implementation manner of the first possible implementation manner of the first aspect, after the sending, by the MTC-IWF device, to an HLR/HSS, a request for acquiring the serving node information or subscription information of the user equipment, the method further includes: registering/subscribing to/requesting, by the MTC-IWF device, with/from/from the HLR/HSS, an association between the user equipment and the serving node of the user equipment, so that the HLR/HSS can return the changed serving node information of the user equipment when learning that the serving node of the user equipment is changed.

In a second possible implementation manner of the first possible implementation manner of the first aspect, after the initiating, by the MTC-IWF device, to an HLR/HSS, a request for acquiring the serving node information or subscription information of the user equipment, the method further includes: sending, by the MTC-IWF device, a first association/binding creation request to the serving node of the user equipment, so that the serving node of the user equipment returns a first association/binding creation response; and receiving, by the MTC-IWF device, the first association/binding creation response returned by the serving node, so as to establish an association/binding relationship with the serving node.

In a second possible implementation manner of the first aspect, before the acquiring, by the MTC-IWF device, locally stored serving node information of the user equipment, the method further includes: receiving, by the MTC-IWF device, a second association/binding creation request sent by the serving node of the user equipment; and sending, by the MTC-IWF device, a second association/binding creation response to the serving node, so as to establish an association/binding relationship with the serving node.

According to a second aspect, a data downlink transmission method is provided, where the method includes: receiving, by a machine type communication interworking function MTC-IWF device, a first message delivered by a server, where the first message includes downlink data that needs to be sent to a user equipment; and acquiring, by the MTC-IWF device, a path between a local location and a serving node of the user equipment, and sending a second message to the serving node of the user equipment through the path, where the second message includes the downlink data that needs to be sent to the user equipment, so that the serving node sends the downlink data to the user equipment.

In a first possible implementation manner of the second aspect, before the acquiring, by the MTC-IWF device, a path between a local location and a serving node of the user equipment, the method further includes: sending, by the MTC-IWF device, to a home location/subscriber register HLR/HSS, a request for acquiring serving node information or subscription information of the user equipment; and receiving and saving, by the MTC-IWF device, the serving node information, returned by the HLR/HSS, of the user equipment; or receiving, by the MTC-IWF device, a subscription information response message returned by the HLR/HSS, and saving the serving node information, carried in the subscription information response message, of the user equipment.

In a first possible implementation manner of the first possible implementation manner of the second aspect, after the initiating, by the MTC-IWF device, to an HLR/HSS, a request for acquiring serving node information or subscription information of the user equipment, the method further includes: sending, by the MTC-IWF device, a first session creation request to the serving node of the user equipment, where the first session creation request carries address information of the MTC-IWF device and a path identifier of the MTC-IWF device, so that the serving node of the user equipment returns a first session creation response, and the first session creation response carries address information of the serving node of the user equipment and a path identifier of the serving node of the user equipment; and receiving, by the MTC-IWF device, the first session creation response returned by the serving node of the user equipment, so as to establish the path between the serving node of the user equipment and the MTC-IWF device In a second possible implementation manner of the second aspect, before the acquiring, by the MTC-IWF device, a path between a local location and a serving node of the user equipment, the method further includes: receiving, by the MTC-IWF device, a second session creation request sent by the serving node of the user equipment, where the second session creation request carries address information of the serving node of the user equipment and a path identifier of the serving node of the user equipment; and returning, by the MTC-IWF device, a second session creation response to the serving node of the user equipment, where the second session creation response carries address information of the MTC-IWF device and a path identifier of the MTC-IWF device, so as to establish the path between the serving node of the user equipment and the MTC-IWF device.

According to a third aspect, a machine type communication interworking function MTC-IWF device is further provided, where the device includes:

a receiving module, configured to receive a first message sent by a server, where the first message includes downlink data that needs to be sent to a user equipment; and a processing module, configured to acquire serving node information, stored in the MTC-IWF device, of the user equipment, and send a second message to a serving node of the user equipment according to the serving node information of the user equipment, where the second message includes the downlink data that needs to be sent to the user equipment, so that the serving node sends the downlink data to the user equipment.

In a first possible implementation manner of the third aspect, the device further includes:

an acquiring module, configured to: before the processing module acquires the serving node information, stored in the MTC-IWF device, of the user equipment, send, to an HLR/HSS, a request for acquiring the serving node information or subscription information of the user equipment; and receive and save the serving node information, returned by the HLR/HSS, of the user equipment; or receive a subscription information response message returned by the HLR/HSS, and save the serving node information, carried in the subscription information response message of the user equipment.

In a first possible implementation manner of the first possible implementation manner of the third aspect, the device further includes:

a second registering/subscribing module, configured to: after the acquiring module sends, to the HLR/HSS, the request for acquiring the serving node information or the subscription information of the user equipment, register/subscribe to/request, with/from/from the HLR/HSS, an association between the user equipment and the serving node of the user equipment, so that the HLR/HSS can return the changed serving node information of the user equipment when learning that the serving node of the user equipment is changed.

In a second possible implementation manner of the first possible implementation manner of the third aspect, the device further includes:

a first creation module, configured to: after the acquiring module initiates, to the HLR/HSS, the request for acquiring the serving node information or the subscription information of the user equipment, send a first association/binding creation request to the serving node of the user equipment, so that the serving node of the user equipment returns a first association/binding creation response; and receive the first association/binding creation response returned by the serving node, so as to establish an association/binding relationship with the serving node.

In a second possible implementation manner of the third aspect, the device further includes:

a second creation module, configured to: before the processing module acquires the serving node information, stored in the MTC-IWF device, of the user equipment, receive a second association/binding creation request sent by the serving node of the user equipment; and send a second association/binding creation response to the serving node, so as to establish an association/binding relationship with the serving node.

According to a fourth aspect, a machine type communication interworking function MTC-IWF device is further provided, where the device includes:

a receiving module, configured to receive a first message delivered by a server, where the first message includes downlink data that needs to be sent to a user equipment; and a processing module, configured to acquire a path between the MTC-IWF device and a serving node of the user equipment, and send a second message to the serving node of the user equipment through the path, where the second message includes the downlink data that needs to be sent to the user equipment, so that the serving node sends the downlink data to the user equipment.

In a first possible implementation manner of the fourth aspect, the device further includes:

an acquiring module, configured to: before the processing module acquires the path between the MTC-IWF device and the serving node of the user equipment, send, to an HLR/HSS, a request for acquiring serving node information or subscription information of the user equipment; and receive and save the serving node information, returned by the HLR/HSS, of the user equipment; or receive a subscription information response message returned by the HLR/HSS, and save the serving node information, carried in the subscription information response message, of the user equipment.

In a first possible implementation manner of the first possible implementation manner of the fourth aspect, the device further includes:

a first path creation module, configured to: after the acquiring module initiates, to the HLR/HSS, the request for acquiring the serving node information or the subscription information of the user equipment, send a first session creation request to the serving node of the user equipment, where the first session creation request carries address information of the MTC-IWF device and a path identifier of the MTC-IWF device, so that the serving node of the user equipment returns a first session creation response, and the first session creation response carries address information of the serving node of the user equipment and a path identifier of the serving node of the user equipment; and receive the first session creation response returned by the serving node of the user equipment, so as to establish the path between the serving node of the user equipment and the MTC-IWF device.

In a second possible implementation manner of the fourth aspect, the device further includes:

a second path creation module, configured to: before the processing module acquires the path between the MTC-IWF device and the serving node of the user equipment, receive a second session creation request sent by the serving node of the user equipment, where the second session creation request carries address information of the serving node of the user equipment and a path identifier of the serving node of the user equipment; and return a second session creation response to the serving node of the user equipment, where the second session creation response carries address information of the MTC-IWF device and a path identifier of the MTC-IWF device, so as to establish the path between the serving node of the user equipment and the MTC-IWF device.

Beneficial effects brought by the technical solutions provided by the embodiments of the present invention are as follows: an MTC-IWF device receives a first message sent by a server, where the first message includes downlink data that needs to be sent to a user equipment; and acquires serving node information of the user equipment locally, and sends a second message to a serving node of the user equipment according to the serving node information of the user equipment, or acquires a path between a local location and the serving node of the user equipment and sends a second message to the serving node of the user equipment through the path, so that the serving node sends the downlink data to the user equipment. Therefore, data can be transmitted to the serving node without the need of querying an HLR/HSS, which reduces the problem of frequently querying the HLR/HSS during downlink data transmission.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Figure 1:
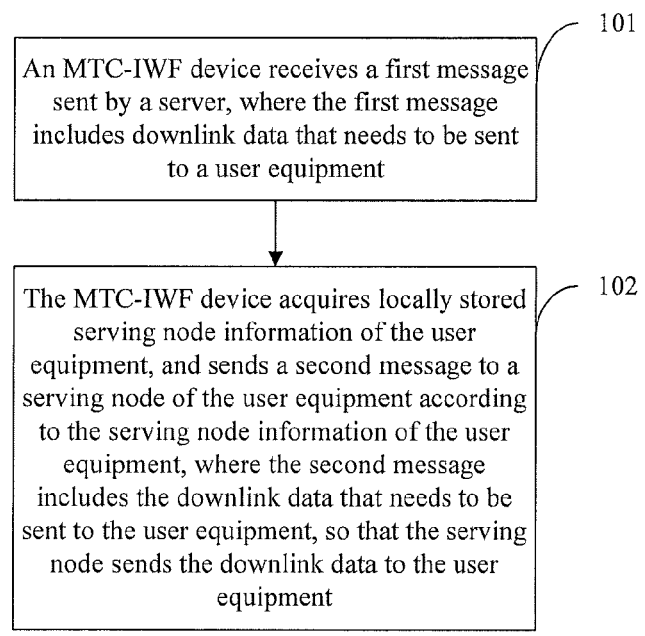
FIG. 1 is a flowchart of a data downlink transmission method according to an embodiment of the present invention.

Referring to FIG. 1, this embodiment provides a data downlink transmission method, where the method includes:

101: An MTC-IWF device receives a first message sent by a server, where the first message includes downlink data that needs to be sent to a user equipment.

102: The MTC-IWF device acquires locally stored serving node information of the user equipment and sends a second message to a serving node of the user equipment according to the serving node information of the user equipment, where the second message includes the downlink data that needs to be sent to the user equipment, so that the serving node sends the downlink data to the user equipment.

Optionally, before the MTC-IWF device acquires the locally stored serving node information of the user equipment, the method further includes that:

the MTC-IWF device sends, to a home location/subscriber register HLR/HSS, a request for acquiring the serving node information or subscription information of the user equipment, and registers/subscribes to/requests, with/from/from the HLR/HSS, an association between the user equipment and the serving node of the user equipment, so that the HLR/HSS can return the changed serving node information of the user equipment when learning that the serving node of the user equipment is changed; and the MTC-IWF device receives and saves the serving node information, returned by the HLR/HSS, of the user equipment; or the MTC-IWF device receives a subscription information response message returned by the HLR/HSS, and saves the serving node information, carried in the subscription information response message, of the user equipment.

Optionally, before the MTC-IWF device acquires the locally stored serving node information of the user equipment, the method further includes that:

the MTC-IWF device sends, to an HLR/HSS, a request for acquiring the serving node information or subscription information of the user equipment; and the MTC-IWF device receives and saves the serving node information, returned by the HLR/HSS, of the user equipment; or the MTC-IWF device receives a subscription information response message returned by the HLR/HSS, and saves the serving node information, carried in the subscription information response message, of the user equipment.

Optionally, after the MTC-IWF device sends, to the HLR/HSS, the request for acquiring the serving node information or the subscription information of the user equipment, the method further includes that:

the MTC-IWF device registers/subscribes to/requests, with/from/from the HLR/HSS, an association between the user equipment and the serving node of the user equipment, so that the HLR/HSS can return the changed serving node information of the user equipment when learning that the serving node of the user equipment is changed.

Optionally, after the MTC-IWF device initiates, to the HLR/HSS, the request for acquiring the serving node information or the subscription information of the user equipment, the method further includes that:

the MTC-IWF device sends a first association/binding creation request to the serving node of the user equipment, so that the serving node of the user equipment returns a first association/binding creation response; and the MTC-IWF device receives the first association/binding creation response returned by the serving node, so as to establish an association/binding relationship with the serving node.

Optionally, before the MTC-IWF device acquires the locally stored serving node information of the user equipment, the method further includes that:

the MTC-IWF device receives a second association/binding creation request sent by the serving node of the user equipment; and the MTC-IWF device sends a second association/binding creation response to the serving node, so as to establish an association/binding relationship with the serving node.

Optionally, the first message further includes indication information, and the indication information indicates that the downlink data is small data or information transmitted by the small data, or indicates that the downlink data is frequent small data or information transmitted by the frequent small data, or indicates that information of downlink small data further exists after the downlink data, or indicates that information of an association between the user equipment and the serving node of the user equipment is to be registered/subscribed to/requested, so that the MTC-IWF device can determine, according to the indication information, whether the serving node information of the user equipment needs to be registered/subscribed to/requested in/from/from the HLR/HSS, or determine whether an association/binding relationship needs to be established with the serving node of the user equipment.

Beneficial effects of this embodiment are as follows: an MTC-IWF device receives a first message sent by a server, where the first message includes downlink data that needs to be sent to a user equipment; and acquires serving node information of the user equipment locally, and sends a second message to a serving node of the UE according to the serving node information of the UE, so that the serving node sends the downlink data to the user equipment. Therefore, data can be transmitted to the serving node without the need of querying an HLR/HSS, which reduces the problem of frequently querying the HLR/HSS during downlink data transmission.

Figure 2:
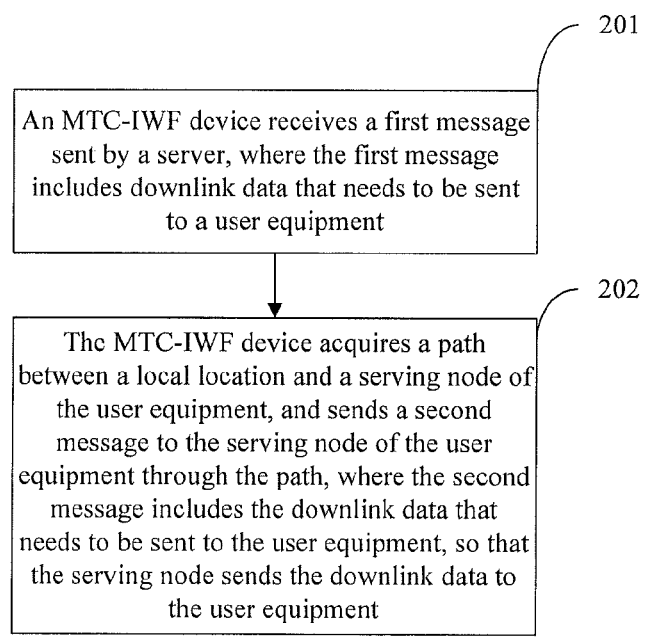
FIG. 2 is a flowchart of a data downlink transmission method according to an embodiment of the present invention.

Referring to FIG. 2, this embodiment provides a data downlink transmission method, where the method includes:

201: An MTC-IWF device receives a first message delivered by a server, where the first message includes downlink data that needs to be sent to a user equipment.

202: The MTC-IWF device acquires a path between a local location and a serving node of the user equipment, and sends a second message to the serving node of the user equipment through the path, where the second message includes the downlink data that needs to be sent to the user equipment, so that the serving node sends the downlink data to the user equipment.

Optionally, before the MTC-IVVF device acquires the path between the local location and the serving node of the user equipment, the method further includes that:

the MTC-IWF device sends, to a home location/subscriber register HLR/HSS, a request for acquiring serving node information or subscription information of the user equipment; and the MTC-IWF device receives and saves the serving node information, returned by the HLR/HSS, of the user equipment; or the MTC-IWF device receives a subscription information response message returned by the HLR/HSS, and saves the serving node information, carried in the subscription information response message, of the user equipment.

Optionally, after the MTC-TWF device initiates, to the HLR/HSS, the request for acquiring the serving node information or the subscription information of the user equipment, the method further includes that:

the MTC-IWF device sends a first session creation request to the serving node of the user equipment, where the first session creation request carries address information of the MTC-IWF device and a path identifier of the MTC-IWF device, so that the serving node of the user equipment returns a first session creation response, and the first session creation response carries address information of the serving node of the user equipment and a path identifier of the serving node of the user equipment; and the MTC-IWF device receives the first session creation response returned by the serving node of the user equipment, so as to establish the path between the serving node of the user equipment and the MTC-IWF device.

Optionally, before the MTC-IWF device acquires the path between the local location and the serving node of the user equipment, the method further includes that:

the MTC-IWF device receives a second session creation request sent by the serving node of the user equipment, where the second session creation request carries address information of the serving node of the user equipment and a path identifier of the serving node of the user equipment; and the MTC-IWF device returns a second session creation response to the serving node of the user equipment, where the second session creation response carries address information of the MTC-IWF device and a path identifier of the MTC-IWF device, so as to establish the path between the serving node of the user equipment and the MTC-IWF device.

Optionally, the first message further includes indication information, the first message further includes indication information, and the indication information indicates that the downlink data is small data or information transmitted by the small data, or indicates that the downlink data is frequent small data or information transmitted by the frequent small data, or indicates that information of downlink small data further exists after the downlink data, or indicates information of the path to be established, so that the MTC-IWF device can determine, according to the indication information, whether the path needs to be established with the serving node of the user equipment.

Beneficial effects of this embodiment are as follows: an MTC-IWF device receives a first message sent by a server, where the first message includes downlink data that needs to be sent to a user equipment; and acquires a path between a local location and a serving node of the user equipment, and sends a second message to the serving node of the user equipment through the path, so that the serving node sends the downlink data to the user equipment. Therefore, data can be transmitted to the serving node without the need of querying an HLR/HSS, which reduces the problem of frequently querying the HLR/HSS during downlink data transmission.

Figure 3:
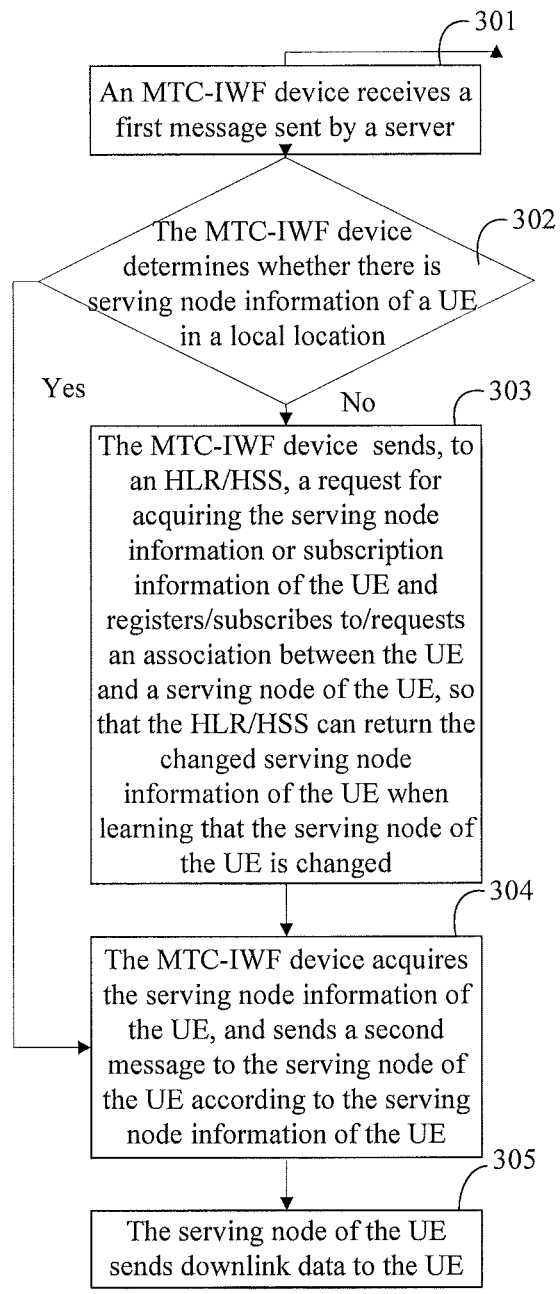
FIG. 3 is a flowchart of a data downlink transmission method according to an embodiment of the present invention.

This embodiment provides a data downlink transmission method. After small data sent by a service is received, an MTC-IWF device registers/subscribes, with/from, an HLR/HSS, and registers/subscribes to an association between a serving node of a UE and the UE. In this way, when the serving node, saved in the HSS, of the UE, is changed, or when the UE is attached, the HLR/HSS notifies the MTC-IWF device of serving node information of the UE. The MTC-IW saves or updates the serving node information of the UE. In this way, in a downlink data transmission process, it no longer needs to query the HLR/HSS for the serving node information of the UE, thereby reducing signaling load of the HLR/HSS. The symbol "/" that occurs in this embodiment and the following embodiments indicates an "or" relationship, which is not described in detail in each of the following embodiments. Referring to FIG. 3, a specific method process includes:

301: The MTC-IWF device receives a first message sent by the server.

The server includes an SCS (Service Capability Server, service capability server) or an AS (Application Server, application server), which is not specifically limited in this embodiment.

The first message delivered by the server includes downlink data that needs to be sent to the UE, where the downlink data includes, but is not limited to, downlink small data, application information, or device trigger information, and the like.

It should be noted that the first message may further carry an external identity external ID of the UE, which is used to query for an internal identity IMSI (International Mobile Subscriber Identification Number, international mobile subscriber identification number) of the UE, so as to identify the UE inside a 3GPP network.

Optionally, the first message further includes indication information, and the indication information includes indicates that the downlink data is small data or information transmitted by the small data, or indicates that the downlink data is frequent small data or information transmitted by the frequent small data, or indicates that information of downlink small data further exists after the downlink data, or indicates that information of the association between the user equipment and the serving node of the user equipment is to be registered/subscribed to/requested, so that the MTC-IWF device can determine, according to the indication information, whether the serving node information of the UE needs to be registered/subscribed to in/from the HLR/HSS, or determine whether an association/binding relationship needs to be established with the serving node of the UE, or determine whether a path needs to be established with the serving node of the UE.

In addition, besides that the first message sent by the server to the MTC-IWF device may include the foregoing indication, when the UE is attached, the serving node of the UE may also send the foregoing indication to the MTC-IWF device; or the HLR/HSS may send the foregoing indication to the MTC-IWF device; or when the MTC-IWF device receives the small data sent by the server and queries the HLR/HSS, the HLR/HSS may send the indication to the MTC-IWF device. How the MTC-IWF device specifically acquires the indication information is not specifically limited in this embodiment.

302: The MTC-IWF device determines whether there is the serving node information of the UE in a local location; if yes, step 304 is performed; otherwise, step 303 is performed.

The serving node of the UE includes: an SGSN (Serving GPRS Support Node, serving GPRS support node)/MME (Mobile Management Entity, mobile management entity). The serving node information refers to routing information of the UE, or information of the serving node, or information of a core network serving node.

303: The MTC-IWF device sends, to the HLR/HSS, a request for acquiring the serving node information or subscription information of the UE, and registers/subscribes to/requests the association between the UE and the serving node of the UE, so that the HLR/HSS can return the changed serving node information of the UE when learning that the serving node of the UE is changed.

In this embodiment, if the MTC-IWF device does not find the serving node information of the UE locally, the MTC-IWF device needs to query the HLR/HSS for the serving node information of the UE first. A specific method for querying the HLR/HSS for the serving node information of the UE includes: sending, by the MTC-IWF device, to the HLR/HSS, the request for acquiring the serving node information or the subscription information of the UE; and receiving and saving the serving node information, returned by the HLR/HSS, of the user equipment; or receiving, by the MTC-IWF device, a subscription information response message returned by the HLR/HSS, and saving the serving node information, carried in the subscription information response message, of the user equipment.

Further, when the serving node information of the UE is acquired, the association between the user equipment and the serving node of the user equipment may be further registered/subscribed to/requested with/from/from the HLR/HSS, so that the HLR/HSS can return the changed serving node information of the UE when learning that the serving node of the UE is changed. Optionally, the association between the user equipment and the serving node of the user equipment may also be registered/subscribed to/requested with/from/from the HLR/HSS after the serving node information of the UE is acquired, so that the HLR/HSS can return the changed serving node information of the UE when learning that the serving node of the UE is changed. The association between the user equipment and the serving node of the user equipment refers to that the serving node of the user equipment is changed or the user equipment is served by another serving node.

In this embodiment, after the MTC-IWF device registers/subscribes to/requests, with/from/from the HLR/HSS, the association between the user equipment and the serving node of the user equipment, when the serving node, saved in the HLR/HSS, of the UE, is changed, or when the UE is attached, the HLR/HSS notifies the MTC-IWF device of the serving node information of the UE. For example, the serving node of the UE is changed in a location update RAU (Route Area Update, routing area update)/TAU (Tracking Area Update, tracking area update) process of the UE, then a new serving node acquires context information of the UE from an original serving node, and sends a location update message to the HLR/HSS to notify the HLR/HSS of current service serving node information of the UE. Alternatively, when the UE is attached, the serving node of the UE also sends a location update message to the HLR/HSS to notify the HLR/HSS of the service serving node information of the UE. The HLR/HSS learns change information of the serving node, and then sends new serving node information to the MTC-IWF device.

In this step, when the first message includes the external identity of the UE, the MTC-IWF device adds the external identity of the UE to a query request when acquiring the serving node information of the UE from the HLR/HSS. The HLR/HSS acquires an IMSI of the UE according to the external identity of the UE, and returns the IMSI and the serving node information of the UE to the MTC-IWF device.

It should be noted that, this step is performed after the MTC-IWF device receives, for the first time, the downlink data sent by the server to the UE. After registering with the HLR/HSS, the MTC-IWF device does not need to perform this step each time the MTC-IWF device sends downlink data to the UE. Therefore, this step is not mandatory in a downlink data transmission process.

304: The MTC-IWF device acquires the serving node information of the UE, and sends a second message to the serving node of the UE according to the serving node information of the UE.

In this step, the MTC-IWF device has saved the serving node information of the UE, and when the downlink data is received, the MTC-IWF device locally acquires information of the serving node on which the UE is located. The MTC-IWF device may acquire, according to external identity information, carried in the first message, of the UE, the information of the serving node on which the UE is located. Optionally, the external identity of the UE may be changed into an internal identity, and the internal identity of the UE may be carried in the second message to be sent together with the downlink data to the serving node of the UE.

305: The serving node of the UE sends the downlink data to the UE.

The serving node receives the downlink data sent by the MTC-IWF device, and sends the downlink data to the UE, thereby completing transmission of the downlink data. This step is similar to the prior art, and is not described in detail again in this embodiment.

Beneficial effects of this embodiment are as follows: an MTC-IWF device may save/update serving node information of a UE, and next time when receiving downlink small data sent to the UE, the MTC-IWF device may send, to a serving node of the UE, a message carrying small data, and it no longer needs to query an HLR/HSS.

Figure 4:
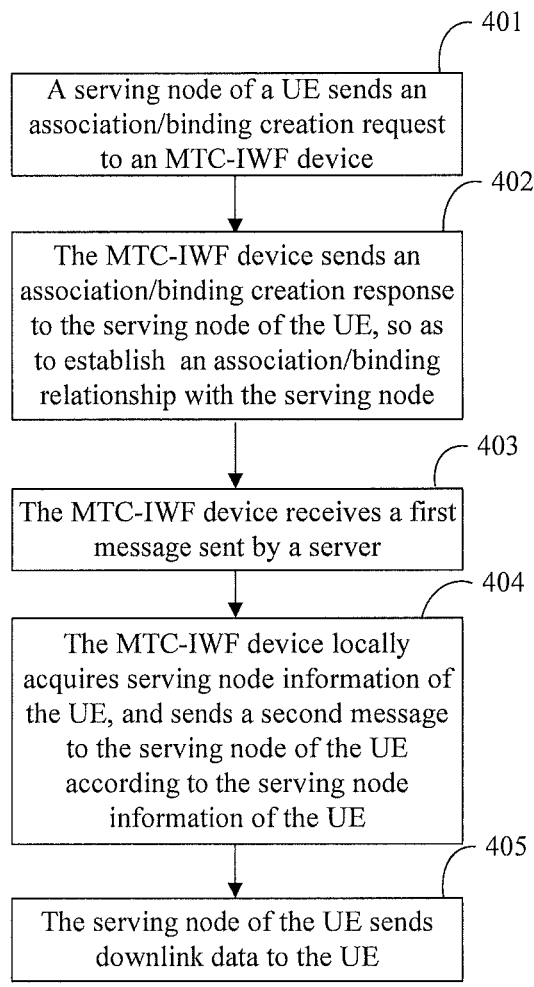
FIG. 4 is a flowchart of a data downlink transmission method according to an embodiment of the present invention.

This embodiment provides a data downlink transmission method. In this embodiment, a serving node of a UE initiates establishment of an association/binding relationship between the serving node and an MTC-IWF device, and the serving node and the MTC-IWF device can learn information of each other by using the established association/binding relationship. Therefore, it does not need to query an HLR/HSS during downlink data transmission. Referring to FIG. 4, a specific method process includes:

401: The serving node of the UE sends an association/binding creation request to the MTC-IWF device.

In this step, scenarios in which the serving node of the UE sends the association/binding creation request to the MTC-IWF device include: the serving node receives an attachment message of the UE or uplink small data sent by the UE; or when an application, with frequent small data transmission, on the UE, starts or goes online, the UE sends small data or a frequent small data indication to the serving node. In the foregoing scenarios, if the serving node of the UE does not establish the association/binding relationship with MTC-IWF device, the serving node of the UE sends the association/binding creation request to the MTC-IWF device.

In this embodiment, for the foregoing scenario in which the association/binding creation is initiated, before the serving node initiates the association/binding creation request to the MTC-IWF device, a corresponding MTC-IWF device needs to be found first. A specific method for acquiring MTC-IWF device information is similar to that in the prior art, including that: the serving node of the UE interacts with an HLR/HSS and acquires the MTC-IWF device information saved in the HLR/HSS; or the serving node of the UE acquires the MTC-IWF device information from an indication of the UE; or the serving node of the UE may also locally configure the MTC-IWF device information. Which specific method is used to acquire the corresponding MTC-IWF device is not specifically limited in this embodiment.

In this embodiment, when the serving node of the UE interacts with the HLR/HSS, identity information of the UE, such as an IMSI of the UE and/or an external identity of the UE, may be further acquired. This is similar to the prior art, and is not described in detail again in this embodiment.

Serving node information is carried in an association/binding creation request message sent by the serving node of the UE, and the identity information of the UE, such as the IMSI of the UE and/or the external identity of the UE, may be further carried, so as to identify the UE inside a 3GPP network, which is not specifically limited in this embodiment.

In this embodiment, another scenario in which the serving node of the UE initiates the association/binding creation request to the MTC-IWF device is: the MTC-IWF device sends a downlink small data notification to the serving node of the UE, and the serving node of the UE initiates the association/binding creation request after receiving the notification sent by the MTC-IWF device.

In this embodiment, another scenario in which the serving node of the UE initiates the association/binding creation request to the MTC-IWF device is: the MTC-IWF device directly requests the serving node of the UE to initiate the association/binding creation request, so as to establish an association/binding relationship between the MTC-IWF device and the serving node on which the UE is located.

402: The MTC-IWF device sends an association/binding creation response to the serving node of the UE, so as to establish an association/binding relationship with the serving node.

The response message carries the MTC-IWF device information, so that the serving node of the UE performs association/binding with the MTC-IWF device according to the MTC-IWF device information.

In this embodiment, after the MTC-IWF device creates the association/binding relationship with the serving node of the UE, when the serving node of the UE is changed, for example, the serving node may be changed in a location update RAU/TAU process of the UE, then a new serving node of the UE acquires context information of the UE from an original serving node of the UE. The context information of the UE includes association/binding information, that is, information of the MTC-IWF device. The original serving node of the UE cancels association/binding with the MTC-IWF device, and the new serving node of the UE sends new serving node information to the MTC-IWF device, so as to establish an association/binding relationship with the MTC-IVVF device.

It should be noted that, steps 401 to 402 are steps that need to be performed when the association/binding relationship has not been established between the MTC-IWF device and the serving node of the UE. If the association/binding relationship has been established between the MTC-IWF device and the serving node of the UE, steps 401 to 402 do not need to be performed during downlink data transmission.

403: The MTC-IWF device receives a first message sent by a server.

This step is similar to step 301 in the foregoing embodiment, and is not described in detail again in this embodiment.

404: The MTC-IWF device acquires the serving node information of the UE locally, and sends a second message to the serving node of the UE according to the serving node information of the UE.

Because the MTC-IWF device has established the association/binding relationship with the serving node of the UE, during downlink data transmission, the MTC-IWF device only needs to acquire information of the serving node of the UE locally according to the external identity of the UE, and it no longer needs to query the HLR/HSS.

Optionally, the external identity of the UE may be changed into an internal identity, and the internal identity of the UE may be carried in the second message to be sent together with the downlink data to the serving node of the UE.

405: The serving node of the UE sends the downlink data to the UE.

This step is similar to step 305 in the foregoing embodiment, and is not described in detail again in this embodiment.

It should be noted that, in this embodiment, after the association/binding relationship is established between the MTC-IWF device and the serving node of the UE, for uplink data transmission, the serving node of the UE may directly send uplink data to the associated/bound MTC-IWF device. Certainly, the uplink data transmission may also be performed according to a method in the prior art, which is not specifically limited in this embodiment.

Beneficial effects of this embodiment are as follows: a serving node of a UE initiates establishment of an association/binding relationship between the serving node of the UE and an MTC-IWF device, and the serving node and the MTC-IWF device may learn information of each other by using the established association/binding relationship. Therefore, it does not need to query an HLR/HSS during downlink data transmission.

Figure 5:
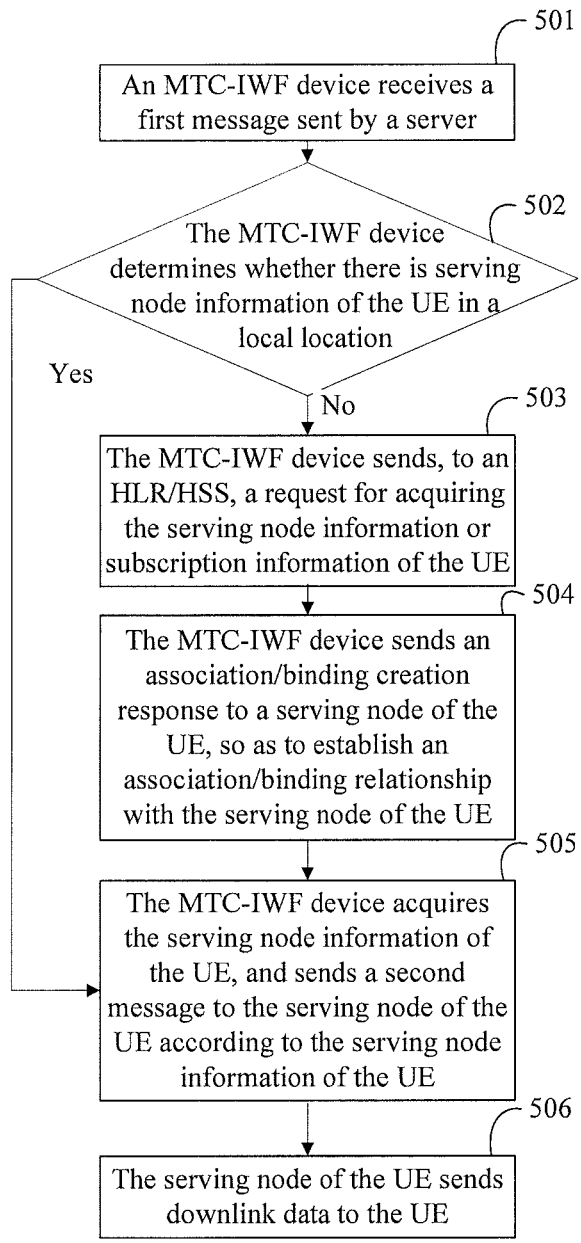
FIG. 5 is a flowchart of a data downlink transmission method according to an embodiment of the present invention.

This embodiment provides a data downlink transmission method. In this embodiment, an MTC-IWF device initiates establishment of an association/binding relationship between a serving node of a UE and the MTC-IWF device, and the serving node and the MTC-IWF device may learn information of each other by using the established association/binding relationship. Therefore, it does not need to query an HLR/HSS during downlink data transmission. Referring to FIG. 5, a specific method process includes:

501: The MTC-IWF device receives a first message sent by a server.

This step is similar to step 301 in the foregoing embodiment, and is not described in detail again in this embodiment.

502: The MTC-IWF device determines whether there is serving node information of the UE locally; if yes, step 505 is performed; otherwise, step 503 is performed.

503: The MTC-IWF device sends, to an HLR/HSS, a request for acquiring the serving node information or subscription information of the UE.

In this embodiment, same as step 303, if the MTC-IWF device does not find the serving node information of the UE locally, the MTC-IWF device needs to acquire the serving node information of the UE from the HLR/HSS first. A specific acquiring method is similar to the acquiring method in step 303, and is not described in detail again in this embodiment.

504: The MTC-IWF device sends an association/binding creation request to the serving node of the UE, so as to establish an association/binding relationship with the serving node of the UE.

In this embodiment, after the serving node information of the UE is found, the association/binding creation request is sent to the serving node of the UE, where the request message carries MTC-IWF device information, and may further carry identity information of the UE. After receiving the association/binding creation request sent by the MTC-IWF device, the serving node of the UE returns an association/binding creation response to the MTC-IWF device, where the response message carries the serving node information. The MTC-IWF device receives the association/binding creation response returned by the serving node, so as to establish the association/binding relationship with the serving node.

In this embodiment, when the MTC-IWF device sends downlink data, if the MTC-IWF device has not established the association/binding relationship with the serving node of the UE, the MTC-IWF device may initiate the association/binding request to the serving node of the UE. However, this is not a unique condition for triggering the MTC-IVVF device to initiate the association/binding creation request; in another scenario, the MTC-IWF device may also be triggered to initiate the association/binding creation request. For example, after the HLR/HSS receives a location update message sent by a new serving node of the UE, the HLR/HSS notifies the MTC-IWF device of current serving node information of the UE, so that the MTC-IWF device initiates the association/binding request to the new serving node of the UE. Alternatively, when the UE is attached, the serving node of the UE sends a location update message to the HLR/HSS, and the HLR/HSS sends a message containing the serving node information of the UE to the MTC-IWF device, so that the MTC-IWF device initiates the association/binding request to the new serving node of the UE.

It should be noted that, steps 503 to 504 are steps that need to be performed when the association/binding relationship has not been established between the MTC-IWF device and the serving node of the UE. If the association/binding relationship has been established between the MTC-IWF device and the serving node of the UE, steps 503 to 504 do not need to be performed during downlink data transmission.

505: The MTC-IWF device acquires the serving node information of the UE, and sends a second message to the serving node of the UE according to the serving node information of the UE.

506: The serving node of the UE sends the downlink data to the UE.

Here, steps 505 to 506 are similar to steps 404 to 405 in the foregoing embodiment, and are not described in detail again in this embodiment.

Beneficial effects of this embodiment are as follows: an MTC-IWF device initiates establishment of an association/binding relationship between a serving node of a UE and the MTC-IWF device, and the serving node and the MTC-IWF device may learn information of each other by using the established association/binding relationship. Therefore, it does not need to query an HLR/HSS during downlink data transmission.

Figure 6:
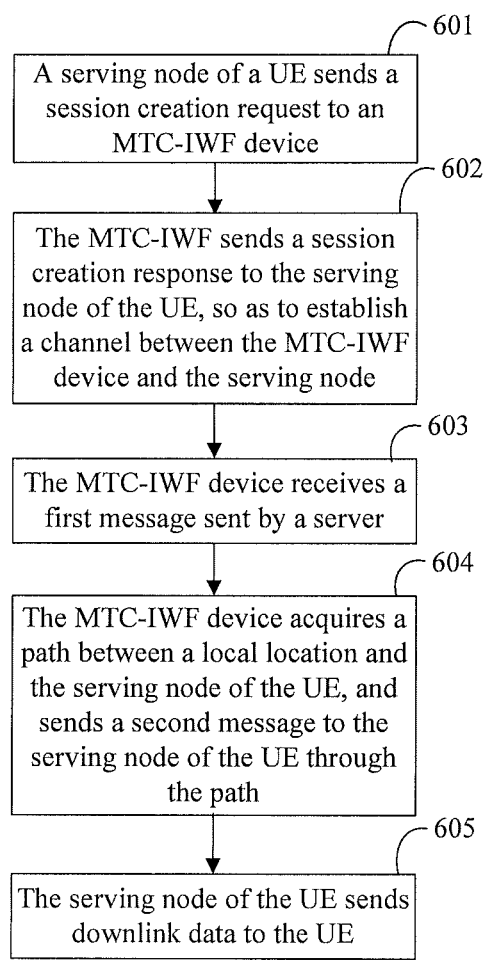
FIG. 6 is a flowchart of a data downlink transmission method according to an embodiment of the present invention.

This embodiment provides a data downlink transmission method. A serving node of a UE initiates establishment of a path between the serving node of the UE and an MTC-IWF device, where the path includes a user plane connection (or referred to as a user plane tunnel) or a control plane connection (or referred to as control plane tunnel). The serving node of the UE and the MTC-IWF device transmit uplink/downlink data through the established path. Referring to FIG. 6, a specific method process includes:

601: The serving node of the UE sends a session creation request to the MTC-IWF device.

In this step, scenarios in which the serving node of the UE sends the session creation request to the MTC-IWF device include: the serving node receives an attachment message of the UE or uplink small data sent by the UE; or when an application, with frequent small data transmission, on the UE, starts or goes online, the UE sends small data or a frequent small data indication to the serving node. In the foregoing scenarios, if the serving node of the UE has not established a path with MTC-IWF device, the serving node of the UE sends the session creation request to the MTC-IWF device. For the foregoing scenario in which the session request is initiated, before the serving node of the UE initiates the session creation request to the MTC-IWF device, a corresponding MTC-IWF device needs to be found first. A specific method for acquiring MTC-IWF device information is similar to that in the prior art, including that: the serving node of the UE interacts with an HLR/HSS and acquires the MTC-IWF device information saved in the HLR/HSS; or the serving node of the UE acquires the MTC-IWF device information from an indication of the UE; or the serving node of the UE may also locally configure the MTC-IWF device information. Which specific method is used to acquire the corresponding MTC-IWF device is not specifically limited in this embodiment.

In this embodiment, when the serving node of the UE interacts with the HLR/HSS, identity information of the UE, such as an IMSI of the UE and/or an external identity of the UE, may be further acquired. This is similar to the prior art, and is not described in detail again in this embodiment.

A session creation request message sent by the serving node of the UE includes an address and a path identifier of the serving node, where, according to a type of a created connection, the path identifier may be a user plane path identifier, or a control plane path identifier, which is not specifically limited in this embodiment.

Optionally, the request message may further carry the identity information of the UE, such as, the IMSI of the UE and/or the external identity of the UE, so as to identify the UE inside a 3GPP network, which is not specifically limited in this embodiment.

It should be noted that, the path identifier of the serving node of the UE may be a general path identifier, or a path identifier reserved or specifically allocated for small data transmission, which is not specifically limited in this embodiment.

In this embodiment, another scenario in which the serving node of the UE initiates the session creation request to the MTC-IWF device is: the MTC-IWF device sends a downlink small data notification to the serving node of the UE, and the serving node of the UE initiates the session creation request after receiving the notification sent by the MTC-IWF device.

In this embodiment, another scenario in which the serving node of the UE initiates the session creation request to the MTC-IWF device is: the MTC-IWF device directly requests the serving node of the UE to initiate the session creation request, so as to establish a user plane or control plane tunnel between the MTC-IWF device and the serving node on which the UE is located.

602: The MTC-IWF device sends a session creation response to the serving node of the UE, so as to establish the path with the serving node.

The response message carries address information and a path identifier of the MTC-IWF device, and according to a type of a created connection, the path identifier may be a user plane path identifier or a control plane path identifier, so as to establish the path with the serving node of the UE.

It should be noted that, the path identifier of the MTC-IWF device may be a general path identifier, or a path identifier reserved or specifically allocated for small data transmission, which is not specifically limited in this embodiment.

In this embodiment, a process in which the MTC-IWF device sends the session creation response to the serving node of the UE to establish the path with the serving node is similar to that in the prior art, which is not described in detail again in this embodiment.

In this embodiment, after the MTC-IWF device establishes the path with the serving node of the UE, when the serving node of the UE is changed, for example, the serving node may be changed in a location update RAU/TAU process of the UE, then a new serving node of the UE acquires context information of the UE from an original serving node of the UE. The context information of the UE includes tunnel information, that is, the address information and path identifier information of the MTC-IWF device, and the original serving node of the UE deactivates a path with the MTC-IWF device, and the new serving node of the UE sends a new session creation request to the MTC-IWF device, so as to establish a path with the MTC-IWF device.

It should be noted that, steps 601 to 602 are steps that need to be performed when the path has not been established between the MTC-IWF device and the serving node of the UE. If the path has been established between the MTC-IWF device and the serving node of the UE, steps 601 to 602 do not need to be performed during downlink data transmission.

603: The MTC-IWF device receives a first message sent by a server.

This step is similar to step 301 in the foregoing embodiment, and is not described in detail again in this embodiment.

604: The MTC-IWF device acquires a path between a local location and the serving node of the UE, and sends a second message to the serving node of the UE through the path.

Because the path has been established between the MTC-IWF device and the serving node of the UE, during downlink data transmission, the MTC-IWF device only needs to find the path between the MTC-IWF device and the serving node of the UE, and does not need to query the HLR/HSS.

Optionally, the external identity of the UE may be changed into an internal identity, and the internal identity of the UE may be carried in the second message to be sent together with the downlink data to the serving node of the UE.

605: The serving node of the UE sends the downlink data to the UE.

This step is similar to step 305 in the foregoing embodiment, and is not described in detail again in this embodiment.

It should be noted that, in this embodiment, after the path has been established between the MTC-IWF device and the serving node of the UE, for uplink data transmission, the serving node of the UE may send uplink data to the MTC-IWF device through the path. Certainly, the uplink data transmission may also be performed according to a method in the prior art, which is not specifically limited in this embodiment.

Beneficial effects of this embodiment are as follows: a serving node of a UE initiates establishment of a path between the serving node of the UE and an MTC-IWF device, and downlink data is directly sent to the serving node of the UE through the path. Therefore, it does not need to query an HLR/HSS during downlink data transmission.

Figure 7:
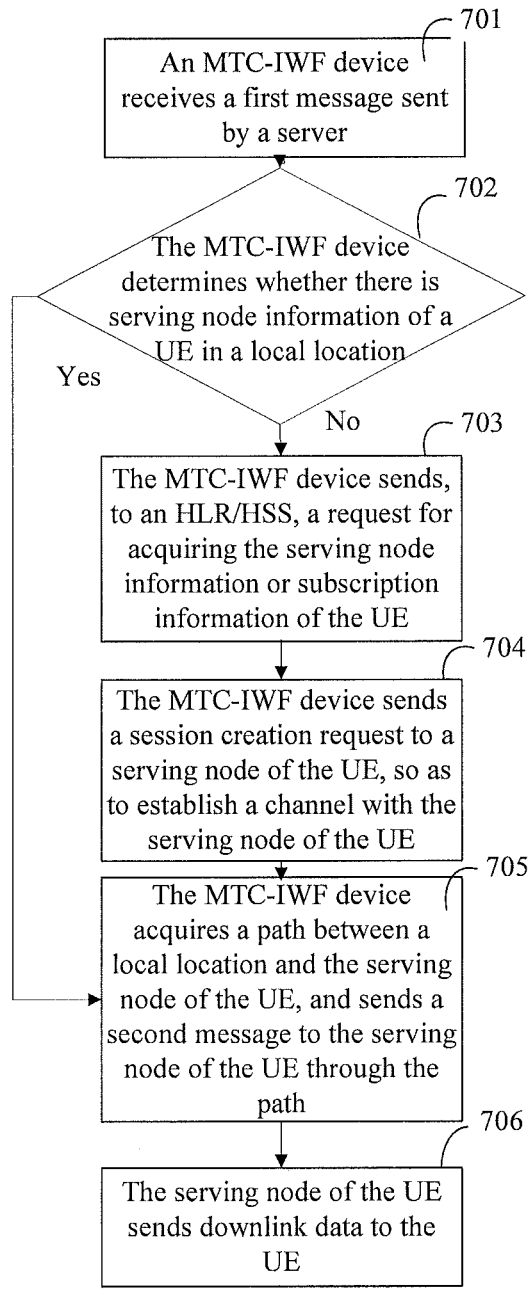
FIG. 7 is a flowchart of a data downlink transmission method according to an embodiment of the present invention.

This embodiment provides a data downlink transmission method. In this embodiment, an MTC-IWF device initiates establishment of a path between a serving node of a UE and the MTC-IWF device, and downlink data is directly sent to the serving node of the UE through the path. Therefore, it does not need to query an HLR/HSS during downlink data transmission. Referring to FIG. 7, a specific method process includes:

701: The MTC-IWF device receives a first message sent by a server.

This step is similar to step 301 in the foregoing embodiment, and is not described in detail again in this embodiment.

702: The MTC-IWF device determines whether there is serving node information of the UE locally; if yes, step 705 is performed; otherwise, step 703 is performed.

703: The MTC-IWF device sends, to an HLR/HSS, a request for acquiring the serving node information or subscription information of the UE.

In this embodiment, same as step 303, if the MTC-IWF device does not find the serving node information of the UE locally, the MTC-IWF device needs to acquire the serving node information of the UE from the HLR/HSS first. A specific acquiring method is similar to the querying method in step 303, and is not described in detail again in this embodiment.

704: The MTC-IWF device sends a session creation request to the serving node of the UE, so as to establish a path with the serving node of the UE.

In this embodiment, after the serving node information of the UE is found, the session creation request is sent to the serving node of the UE, where the request message carries address information and a path identifier of the MTC-IWF device, and the path identifier, according to a type of a created connection, may be a user plane path identifier or a control plane path identifier.

Optionally, the request message may further carry identity information of the UE, such as, an IMSI of the UE and/or an external identity of the UE, so as to identify the UE inside a 3GPP network, which is not specifically limited in this embodiment.

After receiving the session creation request sent by the MTC-IWF device, the serving node of the UE returns a session creation response to the MTC-IWF device, where the response message carries address information and a path identifier of the serving node, and the path identifier, according to the type of the created connection, may be a user plane path identifier or a control plane path identifier.

The MTC-IWF device receives the session creation response returned by the serving node, and establishes the path with the serving node. A specific process in which the MTC-IWF device receives the session creation response sent by the serving node of the UE and establishes the path with the serving node is similar to that in the prior art, which is not described in detail again in this embodiment.

It should be noted that, the path identifier of the MTC-IWF device may be a general path identifier, or a path identifier reserved or specifically allocated for small data transmission. The path identifier of the serving node of the UE may be a general path identifier, or a path identifier reserved or specifically allocated for small data transmission, which is not specifically limited in this embodiment.

In this embodiment, when the MTC-IWF device sends the downlink data, if the MTC-IWF device has not established the path with the serving node of the UE, the MTC-IWF device may initiate the session request to the serving node of the UE. However, this is not a unique condition for triggering the MTC-IWF device to initiate the session creation request; in another scenario, the MTC-IWF device may also be triggered to initiate the session creation request. For example, after the HLR/HSS receives a location update message sent by a new serving node of the UE, the HLR/HSS notifies the MTC-IWF device of current serving node information of the UE, so that the MTC-IWF device initiates a session request to the new serving node of the UE. Alternatively, when the UE is attached, the serving node of the UE sends a location update message to the HLR/HSS, and the HLR/HSS sends a message containing the serving node information of the UE to the MTC-IWF device, so that the MTC-IWF device initiates a session request to the new serving node of the UE.

It should be noted that, steps 703 to 704 are steps that need to be performed when the path has not been established between the MTC-IWF device and the serving node of the UE. If the path has been established between the MTC-IWF device and the serving node of the UE, steps 703 to 704 do not need to be performed during downlink data transmission.

705: The MTC-IWF device acquires a path between a local location and the serving node of the user equipment, and sends a second message to the serving node of the user equipment through the path.

706: The serving node of the UE sends the downlink data to the UE.

Steps 705 to 706 are similar to steps 604 to 605 in the foregoing embodiment, and are not described in detail again in this embodiment.

Beneficial effects of this embodiment are as follows: an MTC-IWF device initiates establishment of a path between a serving node of a UE and the MTC-IWF device, and downlink data is directly sent to the serving node of the UE through the path. Therefore, it does not need to query an HLR/HSS during downlink data transmission.

Figure 8:
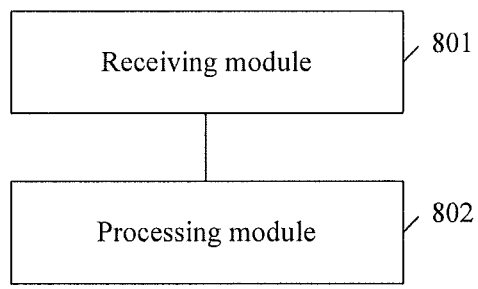
FIG. 8 is a schematic structural diagram of an MTC-IWF device according to an embodiment of the present invention.

Referring to FIG. 8, this embodiment provides a machine type communication interworking function MTC-IWF device, including: a receiving module 801 and a processing module 802.

The receiving module 801 is configured to receive a first message sent by a server, where the first message includes downlink data that needs to be sent to a user equipment.

The processing module 802 is configured to acquire serving node information, stored in the MTC-IWF device, of the user equipment, and send a second message to a serving node of the user equipment according to the serving node information of the user equipment, where the second message includes the downlink data that needs to be sent to the user equipment, so that the serving node sends the downlink data to the user equipment.

Figure 9:
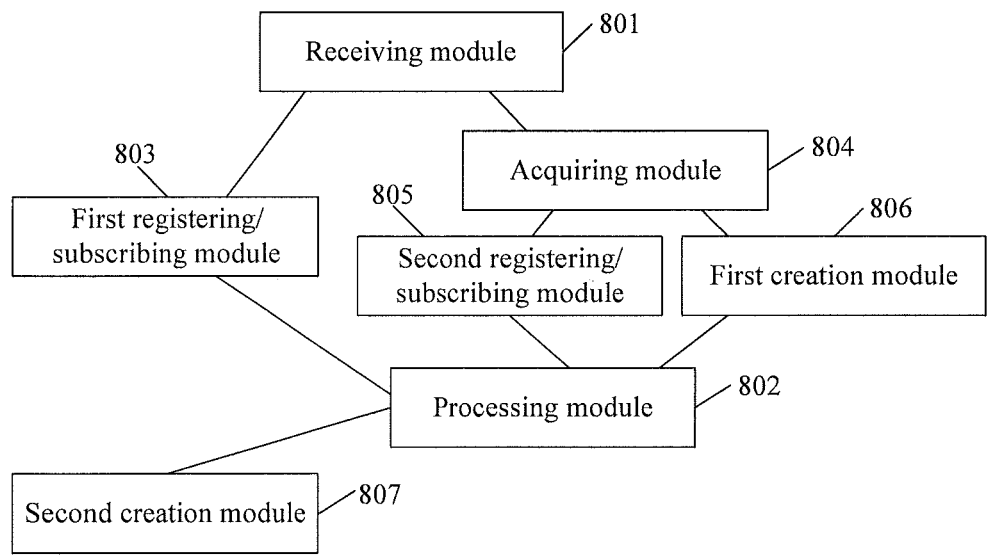
FIG. 9 is a schematic structural diagram of another MTC-IWF device according to an embodiment of the present invention.

Optionally, referring to FIG. 9, the device further includes:

a first registering/subscribing module 803, configured to: before the processing module acquires the serving node information, stored in the MTC-IWF device, of the user equipment, send, to a home location/subscriber register HLR/HSS, a request for acquiring the serving node information or subscription information of the user equipment, and register/subscribe to/request, with/from/from the HLR/HSS, an association between the user equipment and the serving node of the user equipment, so that the HLR/HSS can return the changed serving node information of the user equipment when learning that the serving node of the user equipment is changed; and receive and save the serving node information, returned by the HLR/HSS, of the user equipment; or receive a subscription information response message returned by the HLR/HSS, and save the serving node information, carried in the subscription information response message, of the user equipment.

Optionally, referring to FIG. 9, the device further includes:

an acquiring module 804, configured to: before the processing module acquires the serving node information, stored in the MTC-IWF device, of the user equipment, send, to the HLR/HSS, a request for acquiring the serving node information or subscription information of the user equipment; and receive and save the serving node information, returned by the HLR/HSS, of the user equipment; or receive a subscription information response message returned by the HLR/HSS, and save the serving node information, carried in the subscription information response message, of the user equipment.

Optionally, referring to FIG. 9, the device further includes:

a second registering/subscribing module 805, configured to: after the acquiring module 804 sends, to the HLR/HSS, the request for acquiring the serving node information or the subscription information of the user equipment, register/subscribe to/request, with/from/from the HLR/HSS, an association between the user equipment and the serving node of the user equipment, so that the HLR/HSS can return the changed serving node information of the user equipment when learning that the serving node of the user equipment is changed.

Optionally, referring to FIG. 9, the device further includes:

a first creation module 806, configured to: after the acquiring module 804 initiates, to the HLR/HSS, the request for acquiring the serving node information or the subscription information of the user equipment, send a first association/binding creation request to the serving node of the user equipment, so that the serving node of the user equipment returns a first association/binding creation response; and receive the first association/binding creation response returned by the serving node, so as to establish an association/binding relationship with the serving node.

Optionally, referring to FIG. 9, the device further includes:

a second creation module 807, configured to: before the processing module 802 acquires the serving node information, stored in the MTC-IWF device, of the user equipment, receive a second association/binding creation request sent by the serving node of the user equipment; and send a second association/binding creation response to the serving node, so as to establish an association/binding relationship with the serving node.

Optionally, the first message further includes indication information, and the indication information indicates that the downlink data is small data or information transmitted by the small data, or indicates that the downlink data is frequent small data or information transmitted by the frequent small data, or indicates that information of downlink small data further exists after the downlink data, or indicates that information of an association between the user equipment and the serving node of the user equipment is to be registered/subscribed to/requested, so that the MTC-IWF device can determine, according to the indication information, whether the serving node information of the user equipment needs to be registered/subscribed to/requested with/from/from the HLR/HSS, or determine whether an association/binding relationship needs to be established with the serving node of the user equipment.

Beneficial effects of this embodiment are as follows: an MTC-IWF device receives a first message sent by a server, where the first message includes downlink data that needs to be sent to a user equipment; and acquires serving node information of the user equipment locally, and sends a second message to a serving node of the UE according to the serving node information of the UE, so that the serving node sends the downlink data to the user equipment. Therefore, data can be transmitted to the serving node without the need of querying an HLR/HSS, which reduces the problem of frequently querying the HLR/HSS during downlink data transmission.

Figure 10:
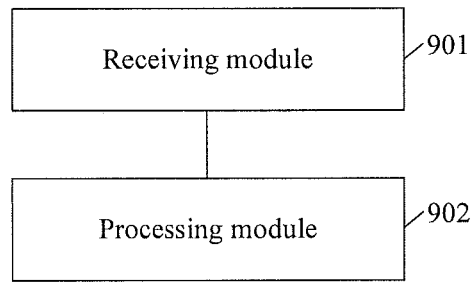
FIG. 10 is a schematic structural diagram of an MTC-IWF device according to an embodiment of the present invention.

Referring to FIG. 10, this embodiment provides a machine type communication interworking function MTC-IWF device, where the device includes: a receiving module 901 and a processing module 902.

The receiving module 901 is configured to receive a first message delivered by a server, where the first message includes downlink data that needs to be sent to a user equipment.

The processing module 902 is configured to acquire a path between the MTC-IWF device and a serving node of the user equipment, and send a second message to the serving node of the user equipment through the path, where the second message includes the downlink data that needs to be sent to the user equipment, so that the serving node sends the downlink data to the user equipment.

Figure 11:
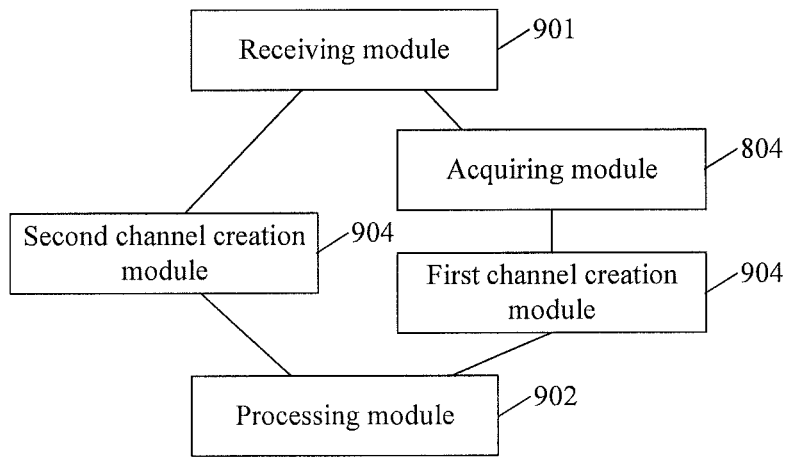
FIG. 11 is a schematic structural diagram of another MTC-IWF device according to an embodiment of the present invention.

Optionally, referring to FIG. 11, the device further includes:

an acquiring module 903, configured to: before the processing module 902 acquires the path between the MTC-IWF device and the serving node of the user equipment, send, to an HLR/HSS, a request for acquiring serving node information or subscription information of the user equipment; and receive and save the serving node information, returned by the HLR/HSS, of the user equipment; or receive a subscription information response message returned by the HLR/HSS, and save the serving node information, carried in the subscription information response message, of the user equipment.

Optionally, referring to FIG. 11, the device further includes:

a first path creation module 904, configured to: after the acquiring module 903 initiates, to the HLR/HSS, the request for acquiring the serving node information or the subscription information of the user equipment, send a first session creation request to the serving node of the user equipment, where the first session creation request carries address information of the MTC-IWF device and a path identifier of the MTC-IWF device, so that the serving node of the user equipment returns a first session creation response, and the first session creation response carries address information of the serving node of the user equipment and a path identifier of the serving node of the user equipment; and receive the first session creation response returned by the serving node of the user equipment, so as to establish the path between the serving node of the user equipment and the MTC-IWF device.

Optionally, referring to FIG. 11, the device further includes:

a second path creation module 904, configured to: before the processing module 902 acquires the path between the MTC-IWF device and the serving node of the user equipment, receive a second session creation request sent by the serving node of the user equipment, where the second session creation request carries address information of the serving node of the user equipment and a path identifier of the serving node of the user equipment; and return a second session creation response to the serving node of the user equipment, where the second session creation response carries address information of the MTC-IWF device and a path identifier of the MTC-IWF device, so as to establish the path between the serving node of the user equipment and the MTC-IWF device.

Optionally, the first message further includes indication information, and the indication information indicates that the downlink data is small data or information transmitted by the small data, or indicates that the downlink data is frequent small data or information transmitted by the frequent small data, or indicates that information of downlink small data further exists after the downlink data, or indicates information of the path to be established, so that the MTC-IWF device can determine, according to the indication information, whether the path needs to be established with the serving node of the user equipment.

Beneficial effects of this embodiment are as follows: an MTC-IWF device receives a first message sent by a server, where the first message includes downlink data that needs to be sent to a user equipment; and acquires a path between a local location and a serving node of the user equipment, and sends a second message to the serving node of the user equipment through the path, so that the serving node sends the downlink data to the user equipment. Therefore, data can be transmitted to the serving node without the need of querying an HLR/HSS, which reduces the problem of frequently querying the HLR/HSS during downlink data transmission.

Figure 12:
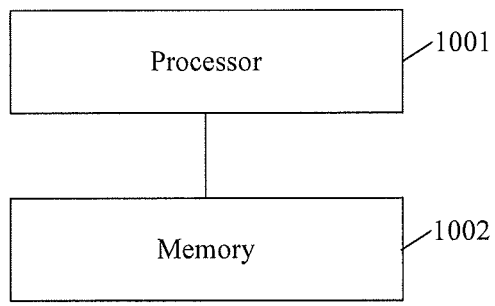
FIG. 12 is a schematic structural diagram of an MTC-IWF device according to an embodiment of the present invention.

Referring to FIG. 12, this embodiment provides a machine type communication interworking function MTC-IWF device, where the device includes: a processor 1001 and a memory 1002.

The memory 1002 is configured to store serving node information of a user equipment.

The processor 1001 is configured to receive a first message sent by a server, where the first message includes downlink data that needs to be sent to the user equipment; acquire the serving node information, stored in the memory 1002, of the user equipment; and send a second message to a serving node of the user equipment according to the serving node information of the user equipment, where the second message includes the downlink data that needs to be sent to the user equipment, so that the serving node sends the downlink data to the user equipment.

Optionally, before the MTC-IWF device acquires the locally stored serving node information of the user equipment, the following is further included:

that the MTC-IWF device sends, to a home location/subscriber register HLR/HSS, a request for acquiring the serving node information or subscription information of the user equipment, and registers/subscribes to/requests, with/from/from the HLR/HSS, an association between the user equipment and the serving node of the user equipment, so that the HLR/HSS can return the changed serving node information of the user equipment when learning that the serving node of the user equipment is changed; and that the MTC-IWF device receives and saves the serving node information, returned by the HLR/HSS, of the user equipment; or that the MTC-IWF device receives a subscription information response message returned by the HLR/HSS, and saves the serving node information, carried in the subscription information response message, of the user equipment.

Optionally, before the MTC-IWF device acquires the locally stored serving node information of the user equipment, the following is further included:

that the MTC-IWF device sends, to an HLR/HSS, a request for acquiring the serving node information or subscription information of the user equipment; and that the MTC-IWF device receives and saves the serving node information, returned by the HLR/HSS, of the user equipment; or that the MTC-IWF device receives a subscription information response message returned by the HLR/HSS, and saves the serving node information, carried in the subscription information response message, of the user equipment.

Optionally, after the MTC-IWF device sends, to the HLR/HSS, the request for acquiring the serving node information or the subscription information of the user equipment, the following is further included:

that the MTC-IWF device registers/subscribes to/requests, with/from/from the HLR/HSS, the association between the user equipment and the serving node of the user equipment, so that the HLR/HSS can return the changed serving node information of the user equipment when learning that the serving node of the user equipment is changed.

Optionally, after the MTC-IWF device initiates, to the HLR/HSS, the request for acquiring the serving node information or the subscription information of the user equipment, the following is further included:

that the MTC-IWF device sends a first association/binding creation request to the serving node of the user equipment, so that the serving node of the user equipment returns a first association/binding creation response; and that the MTC-IWF device receives the first association/binding creation response returned by the serving node, so as to establish an association/binding relationship with the serving node.

Optionally, before the MTC-IWF device acquires the locally stored serving node information of the user equipment, the following is further included:

that the MTC-IWF device receives a second association/binding creation request sent by the serving node of the user equipment; and that the MTC-IWF device sends a second association/binding creation response to the serving node, so as to establish an association/binding relationship with the serving node.

Optionally, the first message further includes indication information, and the indication information indicates that the downlink data is small data or information transmitted by the small data, or indicates that the downlink data is frequent small data or information transmitted by the frequent small data, or indicates that information of downlink small data further exists after the downlink data, or indicates that information of the association between the user equipment and the serving node of the user equipment is to be registered/subscribed to/requested, so that the MTC-IWF device can determine, according to the indication information, whether the serving node information of the user equipment needs to be registered/subscribed to/requested with/from/from the HLR/HSS, or determine whether an association/binding relationship needs to be established with the serving node of the user equipment.

Figure 13:
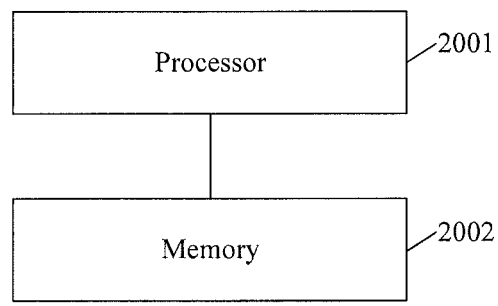
FIG. 13 is a schematic structural diagram of another MTC-IWF device according to an embodiment of the present invention.

Referring to FIG. 13, this embodiment provides a machine type communication interworking function MTC-IWF device, where the device includes: a processor 2001 and a memory 2002.

The memory 2002 is configured to store address information and path identifier information of a serving node of a user equipment.

The processor 2001 is configured to receive a first message delivered by a server, where the first message includes downlink data that needs to be sent to the user equipment; and acquire a path between the MTC-IWF device and the serving node of the user equipment, and send a second message to the serving node of the user equipment through the path, where the second message includes the downlink data that needs to be sent to the user equipment, so that the serving node sends the downlink data to the user equipment.

Optionally, before the MTC-IWF device acquires a path between a local location and the serving node of the user equipment, the following is further included:

that the MTC-IWF device sends, to a home location/subscriber register HLR/HSS, a request for acquiring serving node information or subscription information of the user equipment; and that the MTC-IWF device receives and saves the serving node information, returned by the HLR/HSS, of the user equipment; or that the MTC-IWF device receives a subscription information response message returned by the HLR/HSS, and saves the serving node information, carried in the subscription information response message, of the user equipment.

Optionally, after the MTC-IWF device initiates, to the HLR/HSS, the request for acquiring the serving node information or the subscription information of the user equipment, the following is further included:

that the MTC-IWF device sends a first session creation request to the serving node of the user equipment, where the first session creation request carries address information of the MTC-IWF device and a path identifier of the MTC-IWF device, so that the serving node of the user equipment returns a first session creation response, and the first session creation response carries address information of the serving node of the user equipment and a path identifier of the serving node of the user equipment; and that the MTC-IWF device receives the first session creation response returned by the serving node of the user equipment, so as to establish the path between the serving node of the user equipment and the MTC-IWF device.

Optionally, before the MTC-IWF device acquires the path between a local location and the serving node of the user equipment, the following is further included:

that the MTC-IWF device receives a second session creation request sent by the serving node of the user equipment, where the second session creation request carries address information of the serving node of the user equipment and a path identifier of the serving node of the user equipment; and that the MTC-IWF device returns a second session creation response to the serving node of the user equipment, where the second session creation response carries address information of the MTC-IWF device and a path identifier of the MTC-IWF device, so as to establish the path between the serving node of the user equipment and the MTC-IWF device.

Optionally, the first message further includes indication information, the first message further includes indication information, and the indication information indicates that the downlink data is small data or information transmitted by the small data, or indicates that the downlink data is frequent small data or information transmitted by the frequent small data, or indicates that information of downlink small data further exists after the downlink data, or indicates information of the path to be established, so that the MTC-IWF device can determine, according to the indication information, whether the path needs to be established with the serving node of the user equipment.

Beneficial effects of this embodiment are as follows: an MTC-IWF device receives a first message sent by a server, where the first message includes downlink data that needs to be sent to a user equipment; and acquires a path between a local location and a serving node of the user equipment, and sends a second message to the serving node of the user equipment through the path, so that the serving node sends the downlink data to the user equipment. Therefore, data can be transmitted to the serving node without the need of querying an HLR/HSS, which reduces the problem of frequently querying the HLR/HSS during downlink data transmission.

It should be noted that, in the machine type communication interworking function devices provided in the foregoing embodiments, division of the foregoing function modules is used as an example for illustration. In actual application, the foregoing functions may be accomplished by different modules according to a requirement, that is, an inner structure of the device is divided into different function modules to implement all or part of the functions described above.

In addition, the machine type communication interworking function devices provided in the foregoing embodiments and the downlink data transmission embodiments belong to a same concept. For details of specific implement processes, refer to the method embodiments, and the details are not described herein again.

The sequence numbers of the foregoing embodiments of the present invention are only used for description, and do not represent the superiority or inferiority of the embodiments.

A person of ordinary skill in the art may understand that all or a part of the steps of the embodiments may be implemented by hardware or a program instructing relevant hardware. The program may be stored in a computer readable storage medium. The storage medium may be: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A data downlink transmission method, comprising:
   receiving, by a first communication device, a first message sent by a server, wherein the first message comprises downlink data that needs to be sent to a user equipment; and
   receiving, by the first communication device, a first association request sent by the serving node of the user equipment; and
   sending, by the first communication device, a first association response to the serving node, so as to establish an association with the serving node;
   acquiring, by the first communication device, serving node information of the user equipment stored locally on the first communication device before the first message is received, and sending a second message to a serving node of the user equipment according to the serving node information of the user equipment, wherein the second message comprises the downlink data that needs to be sent to the user equipment, so that the serving node sends the downlink data to the user equipment.

2. The method according to claim 1, before the acquiring, by the first communication device, locally stored serving node information of the user equipment, further comprising:
   sending, by the first communication device, to a home location register/home subscriber server (HLR/HSS), a request for acquiring the serving node information or subscription information of the user equipment, and requesting from the HLR/HSS, an association between the user equipment and the serving node of the user equipment, so that the HLR/HSS can return the changed serving node information of the user equipment when learning that the serving node of the user equipment is changed; and
   receiving and saving, by the first communication device, the serving node information, returned by the HLR/HSS, of the user equipment; or
   receiving, by the first communication device, a subscription information response message returned by the HLR/HSS, and saving the serving node information, carried in the subscription information response message, of the user equipment.

3. The method according to claim 1, before the acquiring, by the first communication device, locally stored serving node information of the user equipment, further comprising:
   sending, by the first communication device, to an HLR/HSS, a request for acquiring the serving node information or subscription information of the user equipment; and
   receiving and saving, by the first communication device, the serving node information, returned by the HLR/HSS, of the user equipment; or
   receiving, by the first communication device, a subscription information response message returned by the HLR/HSS, and saving the serving node information, carried in the subscription information response message, of the user equipment.

4. The method according to claim 3, after the sending, by the first communication device, to an HLR/HSS, a request for acquiring the serving node information or subscription information of the user equipment, further comprising:
   registering, by the first communication device, with the HLR/HSS, an association between the user equipment and the serving node of the user equipment, so that the HLR/HSS can return the changed serving node information of the user equipment when learning that the serving node of the user equipment is changed.

5. The method according to claim 3, after the initiating, by the first communication device, to an HLR/HSS, a request for acquiring the serving node information or subscription information of the user equipment, further comprising:
   sending, by the first communication device, a second association request to the serving node of the user equipment, so that the serving node of the user equipment returns a second association response; and
   receiving, by the first communication device, the second association response returned by the serving node, so as to establish an association with the serving node.

6. The method according to claim 1, wherein the first message further comprises indication information, and the indication information indicates that the downlink data is small data or information transmitted by the small data, or indicates that the downlink data is frequent small data or information transmitted by the frequent small data, or indicates that information of downlink small data further exists after the downlink data, or indicates that information of an association between the user equipment and the serving node of the user equipment is to be requested, so that the first communication device can determine, according to the indication information, whether the serving node information of the user equipment needs to be requested from the HLR/HSS, or determine whether an association needs to be established with the serving node of the user equipment.

7. A data downlink transmission method, comprising:
   receiving, by a first communication device, a first message delivered by a server, wherein the first message comprises downlink data that needs to be sent to a user equipment;
   receiving, by the first communication device, a first session creation request sent by the serving node of the user equipment, wherein the first session creation request carries address information of the serving node of the user equipment and a path identifier of the serving node of the user equipment;
   returning, by the first communication device, a first session creation response to the serving node of the user equipment, wherein the first session creation response carries address information of the first communication device and a path identifier of the first communication device, so as to establish the path between the serving node of the user equipment and the first communication device; and acquiring, by the first communication device, a path between a local location and a serving node of the user equipment, and sending a second message to the serving node of the user equipment through the path, wherein the second message comprises the downlink data that needs to be sent to the user equipment, so that the serving node sends the downlink data to the user equipment.

8. The method according to claim 7, before the acquiring, by the first communication device, a path between a local location and a serving node of the user equipment, further comprising:

sending, by the first communication device, to a home location register/home subscriber server (HLR/HSS), a request for acquiring serving node information or subscription information of the user equipment; and receiving and saving, by the first communication device, the serving node information, returned by the HLR/HSS, of the user equipment; or receiving, by the first communication device, a subscription information response message returned by the HLR/HSS, and saving the serving node information, carried in the subscription information response message, of the user equipment.

9. The method according to claim 8, after the initiating, by the first communication device, to an HLR/HSS, a request for acquiring serving node information or subscription information of the user equipment, further comprising:

sending, by the first communication device, a second session creation request to the serving node of the user equipment, wherein the second session creation request carries address information of the first communication device and a path identifier of the first communication device, so that the serving node of the user equipment returns a second session creation response, and the second session creation response carries address information of the serving node of the user equipment and a path identifier of the serving node of the user equipment; and receiving, by the first communication device, the second session creation response returned by the serving node of the user equipment, so as to establish the path between the serving node of the user equipment and the first communication device.

10. The method according to claim 7, wherein the first message further comprises indication information, and the indication information indicates that the downlink data is small data or information transmitted by the small data, or indicates that the downlink data is frequent small data or information transmitted by the frequent small data, or indicates that information of downlink small data further exists after the downlink data, or indicates information of the path to be established, so that the first communication device can determine, according to the indication information, whether the path needs to be established with the serving node of the user equipment.

11. A communication device, comprising:
a receiving module, configured to receive a first message sent by a server, wherein the first message comprises downlink data that needs to be sent to a user equipment;

a first creation module, configured to receive a first association request sent by the serving node of the user equipment; and send a first association response to the serving node, so as to establish an association with the serving node; and a processing module, configured to acquire serving node information of the user equipment stored locally in the communication device before the first message is received, and send a second message to a serving node of the user equipment according to the serving node information of the user equipment, wherein the second message comprises the downlink data that needs to be sent to the user equipment, so that the serving node sends the downlink data to the user equipment.

12. The device according to claim 11, further comprising:
a first registering module, configured to: before the processing module acquires the serving node information, stored in the communication device, of the user equipment, send, to a home location register/home subscriber server (HLR/HSS), a request for acquiring the serving node information or subscription information of the user equipment, and request from the HLR/HSS, an association between the user equipment and the serving node of the user equipment, so that the HLR/HSS can return the changed serving node information of the user equipment when learning that the serving node of the user equipment is changed; and receive and save the serving node information, returned by the HLR/HSS, of the user equipment; or receive a subscription information response message returned by the HLR/HSS, and save the serving node information, carried in the subscription information response message, of the user equipment.

13. The device according to claim 11, further comprising:
an acquiring module, configured to: before the processing module acquires the serving node information, stored in the communication device, of the user equipment, send, to an HLR/HSS, a request for acquiring the serving node information or subscription information of the user equipment; and receive and save the serving node information, returned by the HLR/HSS, of the user equipment; or receive a subscription information response message returned by the HLR/HSS, and save the serving node information, carried in the subscription information response message, of the user equipment.

14. The device according to claim 13, further comprising:
a second registering module, configured to: after the acquiring module sends, to the HLR/HSS, the request for querying the serving node information or subscription information of the user equipment, request from the HLR/HSS, an association between the user equipment and the serving node of the user equipment, so that the HLR/HSS can return the changed serving node information of the user equipment when learning that the serving node of the user equipment is changed.

15. The device according to claim 13, further comprising:
a second creation module, configured to: after the acquiring module initiates, to the HLR/HSS, the request for acquiring the serving node information or the subscription information of the user equipment, send a second association request to the serving node of the user equipment, so that the serving node of the user equipment returns a second association response; and receive the second association response returned by the serving node, so as to establish an association with the serving node.

16. The device according to claim 11, wherein the first message further comprises indication information, and the indication information indicates that the downlink data is small data or information transmitted by the small data, or indicates that the downlink data is frequent small data or information transmitted by the frequent small data, or indicates that information of downlink small data further exists after the downlink data, or indicates that information of an association between the user equipment and the serving node of the user equipment is to be requested, so that the communication device can determine, according to the indication information, whether the serving node information of the user equipment needs to be requested from the HLR/HSS, or determine whether an association needs to be established with the serving node of the user equipment.

17. A communication device, comprising:

a receiving module, configured to receive a first message delivered by a server, wherein the first message comprises downlink data that needs to be sent to a user equipment;

a first path creation module, configured to receive a first session creation request sent by the serving node of the user equipment, wherein the first session creation request carries address information of the serving node of the user equipment and a path identifier of the serving node of the user equipment; and return a first session creation response to the serving node of the user equipment, wherein the first session creation response carries address information of the communication device and a path identifier of the communication device, so as to establish the path between the serving node of the user equipment and the communication device; and a processing module, configured to acquire a path between the communication device and a serving node of the user equipment, and send a second message to the serving node of the user equipment through the path, wherein the second message comprises the downlink data that needs to be sent to the user equipment, so that the serving node sends the downlink data to the user equipment.

18. The device according to claim 17, further comprising:

an acquiring module, configured to: before the processing module acquires the path between the communication device and the serving node of the user equipment, send, to a home location register/home subscriber server (HLR/HSS), a request for acquiring serving node information or subscription information of the user equipment; and receive and save the serving node information, returned by the HLR/HSS, of the user equipment; or receive a subscription information response message returned by the HLR/HSS, and save the serving node information, carried in the subscription information response message, of the user equipment.

19. The device according to claim 18, further comprising:

a second path creation module, configured to: after the acquiring module initiates, to the HLR/HSS, the request for acquiring the serving node information or the subscription information of the user equipment, send a second session creation request to the serving node of the user equipment, wherein the second session creation request carries address information of the communication device and a path identifier of the communication device, so that the serving node of the user equipment returns a second session creation response, and the second session creation response carries address information of the serving node of the user equipment and a path identifier of the serving node of the user equipment; and receive the second session creation response returned by the serving node of the user equipment, so as to establish the path between the serving node of the user equipment and the communication device.

20. The device according to claim 17, wherein the first message further comprises indication information, and the indication information indicates that the downlink data is small data or information transmitted by the small data, or indicates that the downlink data is frequent small data or information transmitted by the frequent small data, or indicates that information of downlink small data further exists after the downlink data, or indicates information of the path to be established, so that the communication device can determine, according to the indication information, whether the path needs to be established with the serving node of the user equipment.

* * * * *